Oct. 31, 1961     D. G. FAWKES     3,006,600
ROTARY VALVE
Filed Dec. 28, 1956     2 Sheets-Sheet 1
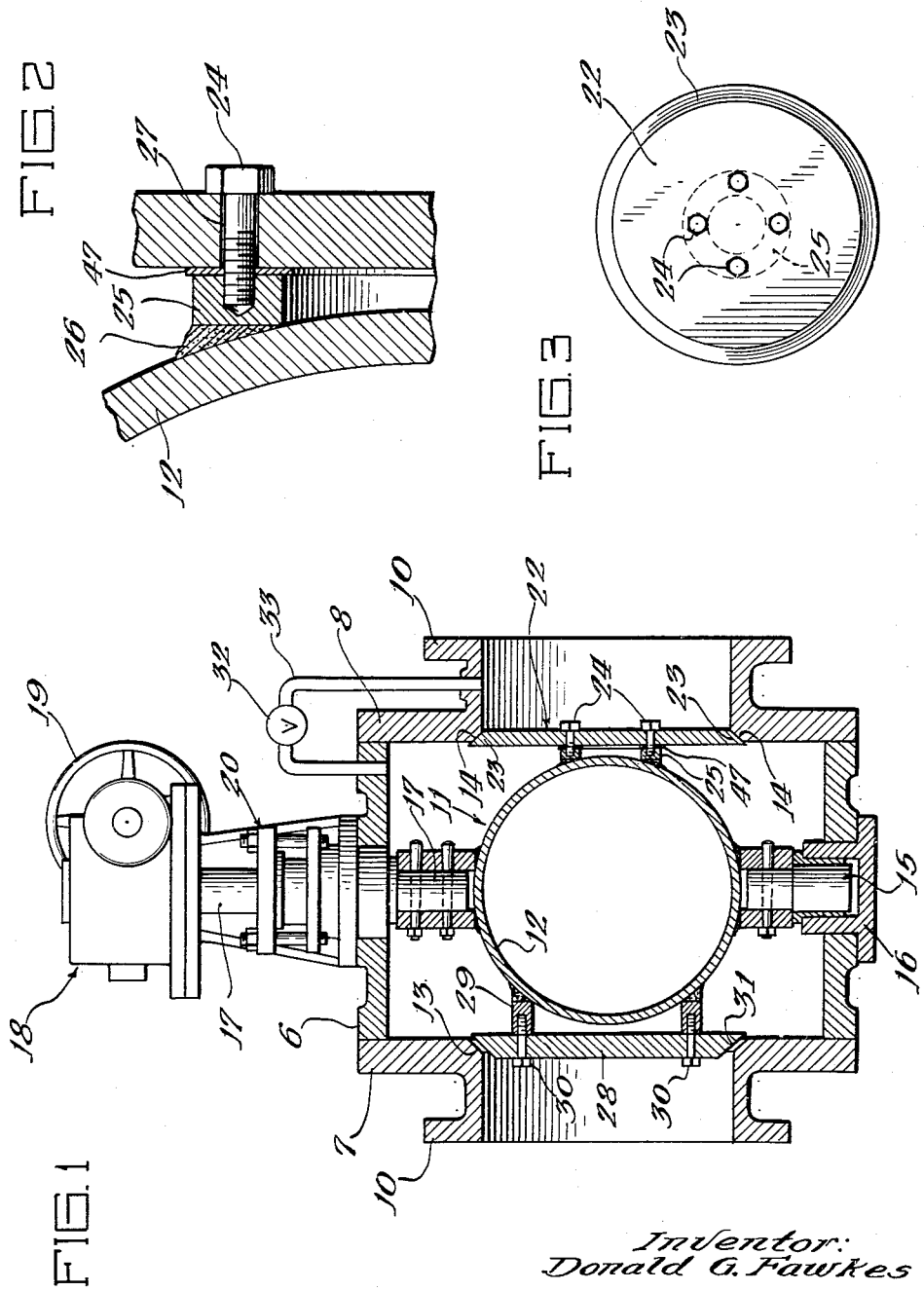
Inventor:
Donald G. Fawkes
By: Schroder, Hofgren,
Brady & Wegner
Attorneys Oct. 31, 1961  D. G. FAWKES  3,006,600
ROTARY VALVE
Filed Dec. 28, 1956  2 Sheets-Sheet 2

Inventor:
Donald G. Fawkes
By: Schroeder, Hofgren,
Brady & Wegner
Attorneys

United States Patent Office 3,006,600
Patented Oct. 31, 1961

3,006,600
ROTARY VALVE
Donald G. Fawkes, Chicago, Ill., assignor to Henry Pratt Company, a corporation of Illinois
Filed Dec. 28, 1956, Ser. No. 631,275
8 Claims. (Cl. 251—175)

This invention relates to rotary valves and more particularly to a structure for closing such valves.

Valves of the type herein involved have been referred to at times by various other names, such as ball valves, rotor-valves and spherical valves. The advantage to such valves is primarily in being able to open completely without obstruction in the valve restricting flow in the line with which it is used. Generally the structure of the valve involves a rotor having a cylindrical pipe section which can be aligned with an inlet and outlet from the valve body. Such a section, of course, contains no obstruction and can be of the same size as the pipe line with which the valve is used.

The valve is closed by a pair of discs mounted on opposite sides of the cylindrical section of the rotor so that they will align themselves with the inlet and outlet, respectively, when the rotor is turned 90° from its open position. There have generally been some disadvantages in such previous valve structures in that the discs were made to sweep tightly in contact with the seats and when such heavy pressure was applied to the discs excessive wear occurred between the discs and seats. In some instances, the wear referred to above became so excessive as to cause considerable leakage through the valve when closed. The only possible way of repairing such leakage was to take the valve out of service, an impractical and seldom followed procedure.

The primary object of this invention is to provide a new and improved rotary valve structure.

Another object is to provide a rotary valve with closure discs so constructed that they move into and out of cooperative relation with seats in out-of-contact relation therewith.

Another object is to provide a rotary valve having structure permitting an accurate control of contact between a closure disc and its seat controlling both seat loads and sealing loads on the valve parts.

Another object is to provide a rotary valve with closure discs which seal with pressure and in which means are provided for selectively releasing the pressure on the discs.

Another object is to provide a valve of the character described which requires less power to operate than previous valves of the same kind.

A further object is to provide a rotary valve structure of the character described which may be easily assembled and adjusted by proper fitting of the cooperating parts.

Other objects, features and advantages of the present invention will be apparent from the following description of preferred embodiments illustrated in the accompanying drawings, in which:

FIGURE 1 is a side elevational view partly in section and partly diagrammatic of a rotary valve involving the present invention;

FIGURE 2 is a fragmentary sectional view much enlarged, illustrating the connection of a valve disc to the cylindrical member of the rotor;

FIGURE 3 is a plan view of the downstream disc;

Figure 4:
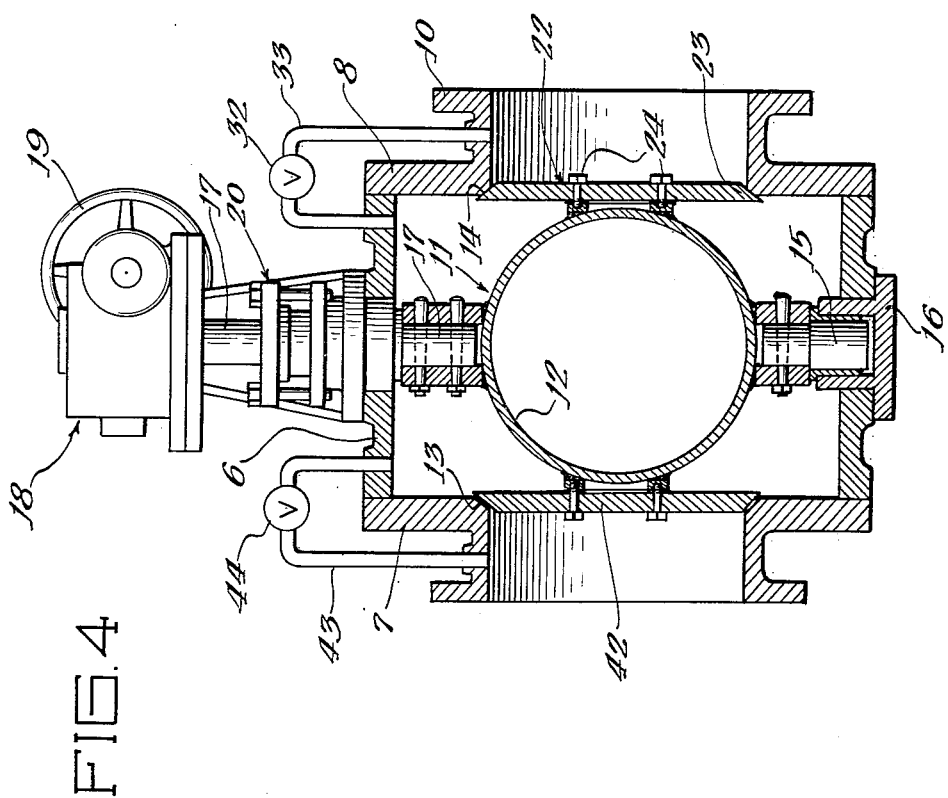
FIGURE 4 is a view similar to FIGURE 1 showing a modification of the invention.

The rotary valves of FIGURES 1 and 4 are similar in their basic parts. Each has a generally cylindrical housing 6 to which is attached an inlet ring 7 and an outlet ring 8 on the upstream and downstream sides, respectively, of the valve. These rings are generally bolted onto the main housing 6 and having flanges 10 properly formed for mating with the type of pipe construction with which the valve is to be used.

A rotor generally indicated 11 is mounted within the main housing and consists of a cylinder 12 of circular, round configuration and of a length to extend between the seats 13 and 14 formed on the end sections 7 and 8. Ordinarily, the section 12 may be made of a piece of pipe and its length will be chosen so as to have a slight clearance with the seats 13 and 14. A stub shaft 15 on the lower end of the cylinder is secured within a bearing structure 16 for supporting one side of the cylinder in the housing. An operating shaft 17 is likewise secured to the upper side of the cylinder and extending on upwardly into a valve operator 18 which is manually operated by a hand wheel 19. A packing gland 20 is provided about the shaft 17 in the usual manner and the operator 18 generally may provide for 90° movement of the rotor within the housing.

The present invention is concerned with the structure of the closure discs and their cooperative relation with the valve seats 13 and 14. Referring particularly to FIGURE 1, it will be noted that the downstream disc 22 is shown with its peripheral edge 23 in contact with the seat 14. In actual practice, the edge 23 and its mating surface 14 will both be machined to approximate spherical surfaces. In FIGURE 3 it will be noted that the disc 22 is mounted by four bolts 24 which secure the disc to a ring 25, in turn welded to the cylinder 12. The particular structure of the ring and the bolts is illustrated in FIGURE 2. The ring is given a contour on the side facing the cylinder 12 to permit welding and the disposition of a weld bead 26 for securing the ring to the cylinder. The four bolts 24 pass through an appropriate bore 27 in the disc and are threaded into the ring. A shim 47 may be placed between the outer face of the ring and the disc in order to accurately position the disc on the cylinder. Shim stock may be obtained commercially in increments of .0005" so that edge 23 of the disc may be accurately positioned relative to the seat 14.

The location of the means attaching the disc 22 to the cylinder is preferably near the center and the disc 22 is made relatively thin so that it will flex under influence of pressure within the housing of the valve. Initially, the disc is accurately positioned relative to the seat 14 to have either very light contact therewith to between .002 and .005" of clearance with the seat. When the valve is first closed, the body of course will be full of liquid and leakage into the valve housing from the upstream side will build up a pressure to cause the flexure of the downstream disc 22 so that its periphery contacts the seat 14.

In order to insure that pressure is present within the valve body, the upstream disc 28 is formed much heavier and is supported by a ring 29 also welded to the cylinder 12, but of larger diameter so that the securing bolts 30 are much nearer the periphery 31 of the disc. Here also a clearance is provided between the periphery of the disc and its seat. This clearance is generally between .002 and .005", the specific amount being a matter of the pressure drop desired across the gap in order to obtain the requisite pressure within the valve housing for flexure of the downstream disc.

In the present valve, it will thus be noted that each disc may be out of contact with its seat during the closing of the valve. The downstream disc flexes onto its seat to form a tight closure. When it is desired to open the valve, a small hand valve 32 in line 33, connected to the valve housing around the disc 22, is opened to relieve the pressure within the valve housing. The disc 22 thus flexes back to its normal clearance with its seat and the valve may be opened without any damaging scraping of the disc over its seat.

Figure 5:
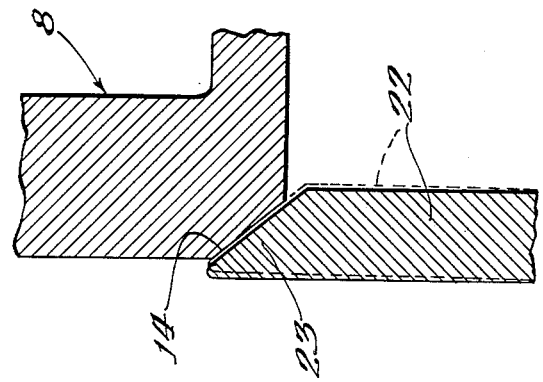
FIGURE 5 is a fragmentary view if the edge of a disc and its seat much enlarged to show the relative position and the operation of the parts.

This function is clearly shown in FIGURE 5 where the disc 22, in its full line position, has a clearance with its seat 14, but in its dotted line position is in contact with its seat.

Some valves of the rotary type may be used in low pressure applications or under pressure conditions which will not materially flex the downstream disc enough to take up a slight built-in clearance between a disc and its seat. Such conditions may be met by placing the disc in a position to lightly contact the seat as it moves onto or off the seat. Such contact being light, will not damage either the disc or seat mating surfaces, yet may effectively close the valve against low pressure leakage. The previously damaging high pressure scraping of a disc over its seat is to be avoided so that accurate positioning of the disc is important.

Temperature variations in the valve may cause some expansion or contraction of the valve parts. This effect has in the past caused some distortion of the seat or disc preventing closure against leakage. In the present valve structure, the resilient flexing of the disc under fluid pressure loading is generally greater than distortion due to temperature variations so that the valve is maintained in good sealing relation despite temperature variations.

In FIGURE 4, an alternate form of valve is shown in which the valve may be placed in a line without regard to the direction of flow in the line. Ordinarily, the valve constructed in accordance with FIGURE 1 will be clearly marked for placement in the line so that the upstream and downstream discs are in proper position. In FIGURE 4, one of the discs 22 is the same as disc 22 in FIGURE 1, the other disc 42 is a duplication as nearly as possible to the disc 22. Thus, each disc is made in the same way so that its periphery will flex under influence of pressure relative to its seat or will seal more tightly if already in contact with its seat. On the upstream side the flexure will increase the gap size between the disc periphery and its seat. On the downstream side a tight seal will be made. In order that the valve may be placed in a line without regard to flow direction, a pressure relieving line 33 with a small valve 32 is provided on one side, as shown in FIGURE 1. An additional line 43 and valve 44 is provided around the other disc 42 for operation in a similar manner.

It is contemplated that the pressure relief valves 32 and 44 may be operated remotely by known mechanisms or tied in with the operation of the valve operator 18. In some instances, power operated means are provided for turning the valve from open to closed position and operation of the pressure relieving line valves may be tied in with such operators. In any event, the discs move out of contact or to their initial light contact position with their seats so that no damage to either of the discs or seats can occur during opening and closing of the valve. The vent pipes, such as 33, are very small in comparison with the size of pipe line with which the valve is used. The area of the vent line need only be slightly larger than the area of the gap between the upstream disc and its seat in order to materially reduce the pressure within the valve body. Proper design of the leakage areas and the by-pass area provide a convenient control over the contact of the downstream disc and its seat during the opening movement of the valve rotor.

The present rotary valve structure may be used in water service in which case the parts will generally be made of one of the stainless corrosion resistant steels. The valve seats may be built up by usual welding procedures and machined or ground to accurate surface finish. The valve structure may be employed in valves ranging in size from a few inches to several feet in diameter. Also, various forms of valve operators may be used to open and close the valve, one advantage of the present valve structure being that less power is needed to effect operation.

The foregoing detailed description has been given for clearness of understanding only and no unnecessary limitations should be understood therefrom, as some modification may be obvious to those skilled in the art.

I claim:

1. A rotary valve capable of handling fluid flow in either direction, comprising: a housing having a pair of spaced seats respectively about an inlet and an outlet; a rotor rotatably mounted in the housing and having a hollow cylindrical body for alignment with the seats in open valve position; a disc on each side of the body cooperatively simultaneously swingable against the seats to close the valve, each said disc having a resiliently flexible peripheral portion, and each being positioned to swing across its seat without tight scraping contact therewith during said swinging, the upstream disc having clearance with its seat in the closed position to allow continuous but restricted flow of fluid under pressure into said housing, the downstream disc being a unitary element extending fully across the outlet when disposed across the seat thereof, the resiliently flexible peripheral portion being adapted to move into contact with its seat under influence of fluid pressure within the valve housing entering through the clearance between the closed upstream disc and its seat; and selectively operable vent passages from the housing to both the upstream and downstream end of the discs having a venting capacity to relieve fluid under pressure therein faster than fluid under pressure is admitted by said upstream disc to thereby unseat said downstream disc to allow rotation of said rotor and thereby opening of said valve without damaging said outlet seat.

2. A rotary valve, comprising: a housing having a pair of spaced seats, respectively about an inlet and an outlet, said seats being capable of sustaining scraping damage; a rotor rotatably mounted in the housing and having a hollow cylindrical body for alignment with the seats in open valve position; a disc on each side of the body cooperatively simultaneously swingable across the seats to close the valve, each said disc being positioned to swing across its seat without tight scraping contact therewith during said swinging, the upstream disc having clearance with its seat in the closed position to allow continuous but restricted flow of fluid under pressure into said housing, the downstream disc being a unitary element extending fully across the outlet when disposed across the seat thereof, and having a resiliently flexible peripheral portion for movement into contact with its seat under influence of fluid pressure within the valve housing entering through the clearance between the closed upstream disc and its seat, said upstream disc providing a clearance with its seat in the closed position which allows a greater flow into said housing than the clearance provided by the downstream disc with its seat in the unflexed position allows out of the housing; and a vent passage in said housing having a venting capacity to relieve fluid under pressure therein faster than fluid under pressure is admitted by said upstream disc to thereby unseat said downstream disc to allow rotation of said rotor and thereby opening of said valve without damaging said outlet seat.

3. A rotary valve as specified in claim 2 wherein each disc has a ring support contoured to fit the cylindrical body on one side and having a planar outer surface for supporting said disc, said disc being removably secured to the ring with a variable number of spacer means interposed therebetween for accurately positioning its periphery relative to its seat.

4. In a rotary valve, a housing having a pair of spaced seats respectively about an inlet and an outlet, said seats being capable of sustaining scraping damage, and a rotor mounting a pair of spaced discs for sweeping movement simultaneously into and out of positions across the seats, said discs being unitary elements extending fully across said inlet and outlet respectively when disposed across said seats, the upstream disc being supported to have its edge spaced from its seat by a pressure drop in the downstream direction thereacross to allow continuous but restricted flow of fluid under pressure into said housing; the downstream disc being supported to have its edge clearance arranged at an initial position within the range of a slight clearance to light non-scraping contact with its seat during said movement, said downstream disc being peripherally resiliently flexible for flexing into tight sealing contact with its seat by fluid pressure admitted to the closed valve housing through clearance between the upstream disc and its seat, said upstream disc providing a clearance with its seat in the closed position which allows a greater flow into said housing than the clearance provided by the downstream disc with its seat in the unflexed position allows out of the housing; and a vent passage in said housing having a venting capacity to relieve fluid under pressure therein faster than fluid under pressure is admitted by said upstream disc to thereby unseat said downstream disc to allow movement of said rotor and thereby opening of said valve without damaging said outlet seat.

5. A rotary valve as specified in claim 4 wherein each disc is peripherally resiliently flexible so that the valve may function with either disc as the upstream disc.

6. In a rotary valve having spaced seats capable of sustaining damage under scraping action located respectively about an inlet and outlet of the valve, a rotor having a pair of discs mounted thereon for simultaneous sweeping movement into a position across the respective seats, the periphery of each disc having a slight clearance with its respective seat during movement into said closed position, the upstream disc having clearance with its seat at all times to allow continuous but restricted flow of fluid under pressure into said valve, and the disc on the downstream side of the valve being resiliently flexible under pressure of fluid admitted past the upstream valve seat to within the valve to flex the downstream disc into sealing contact with its seat, said upstream disc providing a clearance with its seat in the closed position which allows a greater flow into said housing than the clearance providing by the downstream disc with its seat in the unflexed position allows out of the housing, said disc on the downstream side comprising a unitary element extending fully across the outlet when disposed across the seat thereof; and vent means for selectively passing fluid from the valve to downstream thereof at a rate greater tnan the flow rate permitted by the clearance of the upstream disc with its seat to relieve the pressure within the valve housing to permit flexure of the downstream disc away from its seat prior to opening movement of the rotor to prevent damage to said outlet seat.

7. A rotary valve as specified in claim 6 wherein the downstream disc is secured to the body relatively near its central portion with an unsupported peripheral portion extending outwardly therefrom to aid in said flexure toward its seat.

8. A rotary valve, comprising: a valve housing having a pair of aligned spaced valve seats capable of sustaining damage under scraping action, one about an inlet and one about an outlet to the valve housing; a rotor mounted in the valve housing on a pair of opposite trunnions supported in said housing and having a pipe-like section for alignment with the inlet and outlet when the valve is open; a pair of unitary metal valve closure discs, one on each side of the pipe-like section of the rotor, for swinging motion on the rotor through about 90° to simultaneously move the discs across the respective valve seats, the edges of the discs facing the respective seats being positioned with respect to the trunnions of the rotor so that a slight clearance between said edges and the valve seats is present at all times during movement of the rotor, the downstream disc having at least its peripheral portion flexible under influence of fluid pressure to flex said portion toward the valve seat into fluid tight sealing engagement therewith, the upstream disc having a clearance with the upstream valve seat to admit fluid into the valve housing and build up of pressure therein to flex the downstream valve disc into said sealing relation with its valve seat, said upstream disc providing a clearance with its seat in the closed position which allows a greater flow into said housing than the clearance provided by the downstream disc with its seat in the unflexed position allows out of the housing, and vent means for the interior of said valve housing having a capacity greater than the clearance of the upstream disc with its valve seat permitting flexing of said downstream valve disc away from its seat before said rotor is moved toward opening said valve to prevent damage to said outlet seat.

References Cited in the file of this patent

UNITED STATES PATENTS

| | | |
|---|---|---|
| 147,532 | Horn | Feb. 17, 1874 |
| 1,527,482 | Huguenin | Feb. 24, 1925 |
| 1,824,511 | Spieser | Sept. 22, 1931 |
| 2,039,075 | Foell | Apr. 28, 1936 |
| 2,809,011 | Davis | Oct. 8, 1957 |
| 2,857,130 | Brisbane | Oct. 21, 1958 |
| 2,941,779 | Saar | June 21, 1960 |

FOREIGN PATENTS

| | | |
|---|---|---|
| 634,185 | France | Nov. 8, 1927 |
| 857,034 | France | Apr. 8, 1940 |
| 651,114 | Great Britain | Mar. 14, 1951 |